United States Patent
Hoff et al.

(10) Patent No.: US 11,242,921 B2
(45) Date of Patent: Feb. 8, 2022

(54) CLUTCH SYSTEMS FOR A TORQUE CONVERTER

(71) Applicant: Schaeffler Technologies AG & Co. KG, Herzogenaurach (DE)

(72) Inventors: Austin Hoff, New Franklin, OH (US); Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/810,026

(22) Filed: Mar. 5, 2020

(65) Prior Publication Data
US 2020/0284331 A1   Sep. 10, 2020

Related U.S. Application Data

(60) Provisional application No. 62/814,724, filed on Mar. 6, 2019.

(51) Int. Cl.
*F16H 45/02* (2006.01)

(52) U.S. Cl.
CPC ..... *F16H 45/02* (2013.01); *F16H 2045/0205* (2013.01); *F16H 2045/0215* (2013.01); *F16H 2045/0231* (2013.01); *F16H 2045/0289* (2013.01); *F16H 2045/0294* (2013.01)

(58) Field of Classification Search
CPC .......................... F16H 2045/0205–0215; F16H 2045/0278–0294
See application file for complete search history.

(56) References Cited

U.S. PATENT DOCUMENTS

| | | | | |
|---|---|---|---|---|
| 3,185,273 | A * | 5/1965 | Smirl | F16H 45/02 192/3.3 |
| 3,280,657 | A * | 10/1966 | Holdeman | F16H 47/06 74/732.1 |
| 6,725,988 | B2 * | 4/2004 | Bauer | F16H 45/02 192/200 |
| 7,389,861 | B2 * | 6/2008 | Ackermann | F16H 61/14 192/3.3 |
| 7,621,385 | B2 | 11/2009 | Samie et al. | |
| 8,348,037 | B2 * | 1/2013 | Carrier | F16H 45/02 192/3.3 |
| 8,839,923 | B2 * | 9/2014 | Greathouse | F16H 45/02 192/3.29 |
| 2006/0124421 | A1 * | 6/2006 | Ackermann | F16H 45/02 192/3.29 |

\* cited by examiner

*Primary Examiner* — Ernesto A Suarez
*Assistant Examiner* — James J Taylor, II
(74) *Attorney, Agent, or Firm* — Lekeisha Suggs

(57) ABSTRACT

A torque converter comprises a cover configured to receive an input torque and an impeller having an impeller shell non-rotatably connected to the cover. A piston is disposed axially between the cover and the impeller. The piston is configured to axially displace to selectively engage a clutch and a seal plate is disposed axially between the piston and the cover. The seal plate is sealed to the cover. A first chamber is formed at least in part by the cover, the seal plate, and the piston. A second chamber is formed at least in part by the piston and the impeller shell.

18 Claims, 2 Drawing Sheets

CLUTCH SYSTEMS FOR A TORQUE CONVERTER

CROSS-REFERENCE TO RELATED APPLICATIONS

This application claims the benefit of U.S. Provisional Patent Application No. 62/814,724, filed Mar. 6, 2019, the disclosure of which is incorporated in its entirety by reference herein.

TECHNICAL FIELD

The present disclosure relates to torque converters and, specifically, to clutch systems for a torque converter.

BACKGROUND

Automotive vehicles with automatic transmissions are known to be equipped with a torque converter. The torque converter is a fluid coupling that can transfer rotating power from an engine to an automatic transmission. Torque converters typically include a front cover fixed to an impeller, which rotate as a unit to transfer fluid through the torque converter.

To improve fuel economy, many torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these hubs may be expensive and add complexity to a torque converter design. Accordingly, it is desirable to provide alternative methods for providing fluid flow paths to pressurized chambers of a torque converter, while maintaining clutch controllability and reducing design complexity.

SUMMARY

Embodiments disclose a torque converter comprising a cover configured to receive an input torque and an impeller having an impeller shell non-rotatably connected to the cover. A piston is disposed axially between the cover and the impeller. The piston is configured to axially displace to selectively engage a clutch and a seal plate is disposed axially between the piston and the cover. The seal plate is sealed to the cover. A first chamber is formed at least in part by the cover, the seal plate, and the piston. A second chamber is formed at least in part by the piston and the impeller shell.

In embodiments, the seal plate is sealed to the cover via a seal at a first end and connected to the cover and the piston at a second end, opposite the first end. A valve is disposed between, and connected to, the seal plate and the piston. The seal plate includes first and second orifices, the first and second orifices being radially offset. A portion of the valve is configured to seal the first orifice to restrict fluid flow to one direction. Moreover, in response to an increase of pressurized fluid in the first chamber relative to the second chamber: the piston is configured to axially displace to open the clutch; and the portion of the valve opens such that fluid flow passes through the first orifice from the first chamber. And, in response to an increase of pressurized fluid in the second chamber relative to the first chamber: the piston is configured to axially displace to close the clutch; fluid passes from the second chamber, through grooved surfaces of the clutch and then into the first chamber via the second orifice of the seal plate; and the portion of the valve closes such that fluid cannot pass through the first orifice.

In embodiments, the first orifice may be located radially inward of the second orifice. The valve may be a reed valve. The valve may also be riveted to the seal plate and the piston. The clutch may further include a clutch plate disposed between the cover and the piston. The clutch plate may have a first frictional surface configured to engage with the cover and a second frictional surface, axially opposite the first frictional surface, configured to engage with the piston. At least one of the first frictional surface or the second frictional surface may include grooves defined therein for fluid flow therethrough. The torque converter may further include a damper assembly, wherein the clutch plate is an input to the damper assembly. The piston may be arranged to seal on a transmission input shaft at an inner diameter thereof and the first chamber is sealed from the second chamber.

In embodiments, a torque converter comprises a cover configured to receive an input torque and an impeller having an impeller shell non-rotatably connected to the cover. The torque converter has a clutch including a piston disposed axially between the cover and the impeller, wherein the piston is configured to axially displace for engagement of the clutch. A seal plate is sealed to the cover and disposed axially between the piston and the cover. A first chamber is formed at least in part by the cover, the seal plate, and the piston. A second chamber is formed at least in part by the piston and the impeller shell. Moreover, in response to an increase of pressurized fluid in the first chamber relative to the second chamber, the piston is configured to axially displace to open the clutch. And, in response to an increase of pressurized fluid in the second chamber relative to the first chamber, the piston is configured to axially displace to close the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In general, having increased torque converter clutch controllability helps improve vehicle efficiency and NVH. However, it typically increases cost to have a complicated clutch system, like a traditional three or four-pass torque converter design. It is an objective of the present disclosure to provide clutch systems having increased clutch controllability for simpler and less expensive designs, such as improved clutch systems for a two-pass torque converter design. Moreover, embodiments of the present disclosure provide clutch systems for controlling fluid velocity and reducing dynamic pressure differences that may be seen on opposite sides of a piston in a torque converter.

Figure 1:
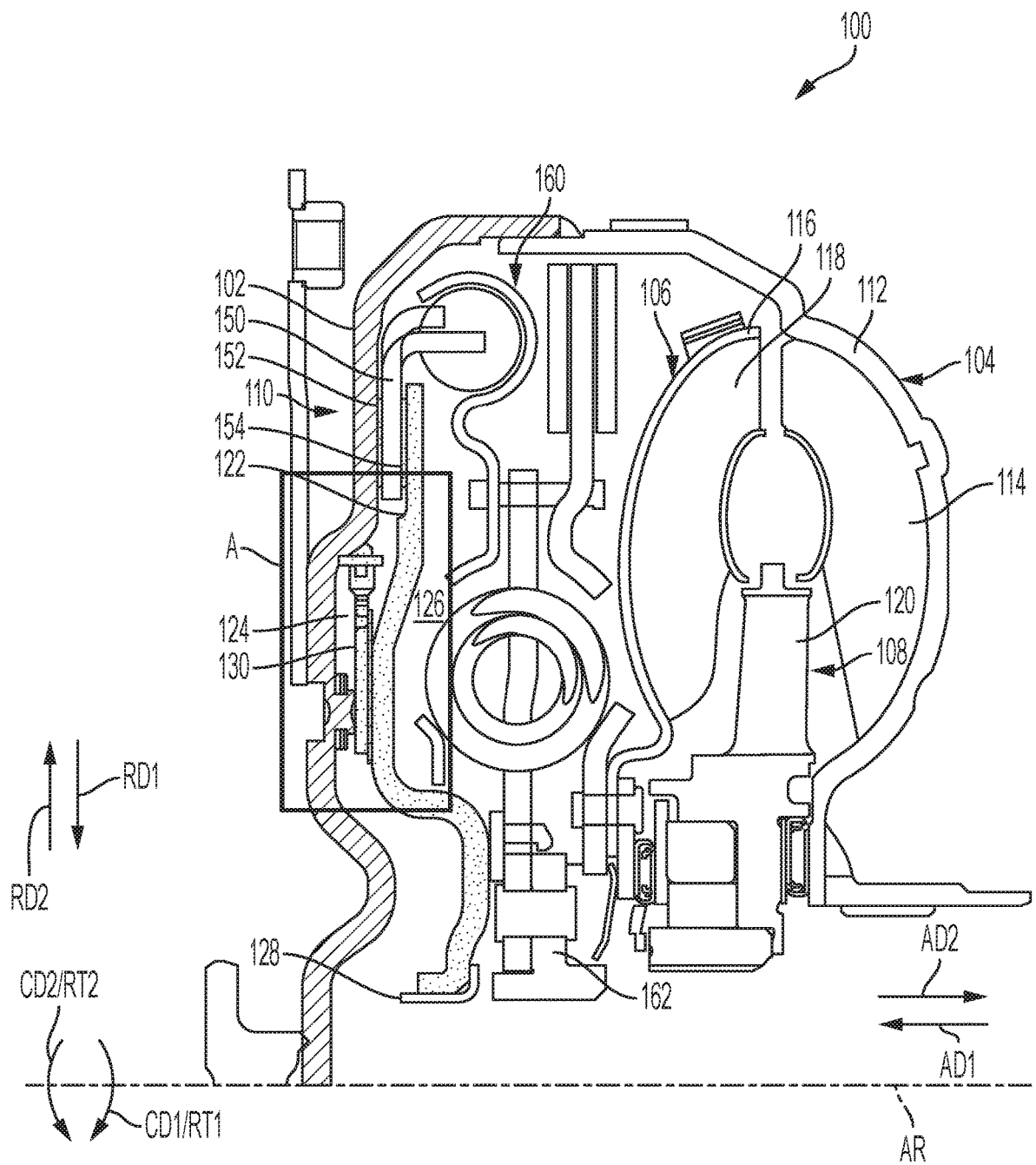
FIG. 1 shows a torque converter having a clutch system according to one embodiment of the present disclosure.

FIG. 1 is a partial cross-sectional view of torque converter 100. Torque converter 100 includes: cover 102 supported for rotation around axis of rotation AR and arranged to receive rotational torque RT1 in circumferential direction CD1 or rotational torque RT2 in circumferential direction CD2 opposite direction CD1; impeller 104 supported for rotation around axis AR; turbine 106; stator 108, and lock-up clutch 110. Impeller 104 includes: impeller shell 112 non-rotatably connected to cover 102; and at least one impeller blade 114 non-rotatably connected to impeller shell 110. Turbine 106 is in fluid communication with impeller 104 and includes: turbine shell 116; and at least one turbine blade 118 non-rotatably connected to turbine shell 114. Stator 108 includes at least one stator blade 120 between impeller 104 and turbine 106. While only a portion above the axis AR is shown in FIG. 1, it should be understood that torque converter 100 can appear substantially similar below the axis with many components extending about the axis. Words such as "axial," "radial," "circumferential," "outward," etc. as used herein are intended to be with respect to axis of rotation AR.

Figure 2:
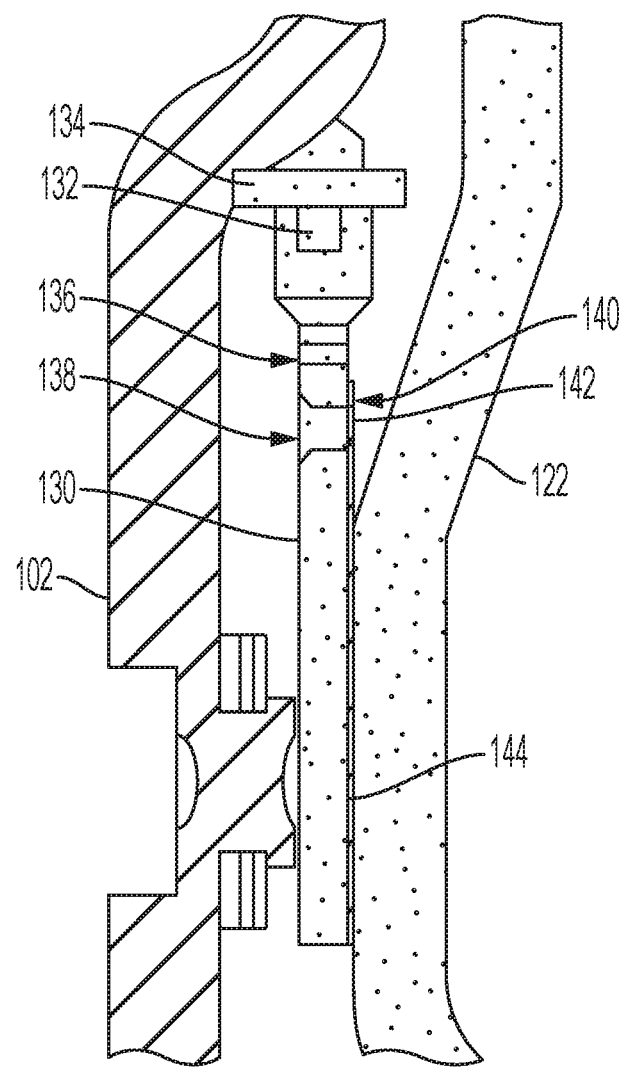
FIG. 2 is an enlarged view of area A of the torque converter of FIG. 1.

FIG. 2 is a detail of area A of torque converter 100 shown in FIG. 1. The following should be viewed in light of FIGS. 1 and 2. Lock-up clutch 110 includes piston 122 axially displaceable in first axial direction AD1 and second axial direction AD2, opposite axial direction AD1. Torque converter 100 includes pressure chambers 124 and 126. Chambers 124 and 126 are bounded at least in part by piston plate 122. Piston plate 122 is displaceable, in response to pressure in pressure chamber 126 (increasing fluid pressure in chamber 126), in axial direction AD1 to close clutch 110 and non-rotatably connect piston plate 122 to cover 102. Piston plate 122 is displaceable, in response to pressure in chamber 124 (increasing fluid pressure in chamber 124), in axial direction AD2 to open clutch 110 so that piston plate 122 is rotatable with respect to cover 102. Piston 122 is arranged to seal on a transmission input shaft, for example, via seal 128 at an inner diameter thereof. By "non-rotatably connected" elements we mean that: whenever one of the elements rotates at a particular speed, all of the elements rotate at that particular speed, and relative rotation between the elements is not possible. Axial or radial displacement of the elements with respect to each other is possible.

Seal plate 130 is disposed between piston 122 and cover 102. Seal plate 130 is sealed to cover 102 sealing pressure chamber 124. That is, pressure chamber 124 is sealed from pressure chamber 126, and is bounded at least in part by seal plate 130, piston 122, and cover 102. Seal plate may be sealed to cover 102 via seal 132 at an outer diameter thereof. In one embodiment, weld ring 134 may be welded to cover 102 and seal plate 130 may be sealed to weld ring 134 via seal 132. In other embodiments, seal plate 130 may be sealed directly to cover 102.

Seal plate 130 includes orifice 136 and orifice 138 that are radially offset from one another. Orifice 138 is located radially inward of orifice 136. Orifice 138 is sealed by valve 140 that is disposed between seal plate 130 and piston 122. Valve 140 is configured to restrict flow of fluid through orifice 138 to a single direction and is configured to open and close under changing pressure on each face. That is, valve 140 is configured to restrict the flow of fluid from chamber 124 and through orifice 138. In one embodiment, valve 140 may be a reed valve, for example. However, it is to be understood that other types of valves or devices may be used to restrict the flow to one direction. Valve 140 may have a first end 142 that covers orifice 138 and a second end 144, opposite first end 142 that is connected between seal plate 130 and piston 122. Valve 140 may be riveted to seal plate 130 and piston 122, for example.

Lock-up clutch 110 may further include clutch plate 150 disposed between cover 102 and piston 122 with clutch facings 152 and 154 arranged therebetween. Clutch facing 152 may be disposed between cover 102 and clutch plate 150. Clutch facing 152 may be mounted on cover 102 or on clutch plate 150 for frictional engagement therebetween. Clutch facing 154 may be disposed between piston 122 and clutch plate 150. Clutch facing 154 may be mounted on piston 122 or on clutch plate 150 for frictional engagement therebetween. That is, lock-up clutch 110 may be a twin-face plate clutch. However, it is to be understood that fewer or more clutch plates may be used. Clutch facings 152 and 154 each include grooves defined therein to allow fluid flow therethrough for forced clutch cooling during operation.

Various modes of operation of torque converter 100 will now be described. In a first mode of operation (also referred to as a torque converter clutch closed mode of operation), clutch 110 is closed and fluid will flow through grooves in clutch facings 152, 154 and through orifice 136 into chamber 124. Moreover, valve 140 will cover or seal orifice 138 because of pressure of fluid on a side of valve 140 facing piston 122 such that fluid cannot pass therebetween. In a second mode of operation (also referred to as a torque converter clutch open mode of operation), clutch 110 is open, pressurized fluid is supplied to chamber 124, and pressurized fluid in chamber 124 causes valve 140 to open allowing fluid to pass through orifice 138.

Torque converter 100 may further include damper 160 and output hub 162 arranged to non-rotatably connect to a transmission input shaft (not shown). Clutch plate 150 may be arranged to act as input to damper 160 for transfer of torque therebetween. However, it is to be understood that torque converter 100 is not limited to the components shown in FIG. 1.

Embodiments disclosed herein combine the simplicity and cost of a traditional torque converter with a twin-face clutch with some of the controllability benefits of a more complex clutch system by adding a sealed torque converter clutch release pressure chamber. In this design, a traditional hub is not used for routing fluid thereby allowing the piston to seal on the input shaft and reducing complexity and cost. Additionally, the use of an orifice hole that is sealed by a one-way valve (e.g., a reed valve) helps reduce pressure bumps and allows forced flow cooling through the clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A torque converter, comprising:
   a cover configured to receive an input torque;
   an impeller having an impeller shell non-rotatably connected to the cover;
   a piston disposed axially between the cover and the impeller, wherein the piston is configured to axially displace to selectively engage a clutch;
   a seal plate disposed axially between the piston and the cover, wherein:
      the seal plate is sealed to the cover;
      a first chamber is formed at least in part by the cover, the seal plate, and the piston; and
      a second chamber is formed at least in part by the piston and the impeller shell; and
   a valve disposed between, and connected to, the seal plate and the piston, wherein the seal plate includes a first orifice and a portion of the valve is configured to seal the first orifice to restrict fluid flow to one direction.

2. The torque converter of claim 1, wherein the seal plate is sealed to the cover via a seal at a first end and connected to the cover and the piston at a second end, opposite the first end.

3. The torque converter of claim 1, wherein:
   the seal plate includes a second orifice, the first and second orifices being radially offset.

4. The torque converter of claim 3, wherein, in response to an increase of pressurized fluid in the second chamber relative to the first chamber:
   the piston is configured to axially displace to close the clutch;
   fluid passes from the second chamber, through grooved surfaces of the clutch and then into the first chamber via the second orifice of the seal plate; and
   the portion of the valve closes such that fluid cannot pass through the first orifice.

5. The torque converter of claim 1, wherein, in response to an increase of pressurized fluid in the first chamber relative to the second chamber:
   the piston is configured to axially displace to open the clutch; and
   the portion of the valve opens such that fluid flow passes through the first orifice from the first chamber.

6. The torque converter of claim 1, wherein the valve is a reed valve.

7. The torque converter of claim 1, wherein the valve is riveted to the seal plate and the piston.

8. The torque converter of claim 1, wherein the clutch further includes a clutch plate disposed between the cover and the piston, the clutch plate having a first frictional surface configured to engage with the cover and a second frictional surface, axially opposite the first frictional surface, configured to engage with the piston.

9. The torque converter of claim 8, wherein at least one of the first frictional surface or the second frictional surface includes grooves defined therein for fluid flow therethrough.

10. The torque converter of claim 8, further comprising a damper assembly, wherein the clutch plate is an input to the damper assembly.

11. The torque converter of claim 1, wherein the piston is arranged to seal on a transmission input shaft at an inner diameter thereof.

12. The torque converter of claim 1, wherein the first chamber is sealed from the second chamber.

13. A torque converter, comprising:
   a cover configured to receive an input torque;
   an impeller having an impeller shell non-rotatably connected to the cover;
   a clutch including a piston disposed axially between the cover and the impeller, wherein the piston is configured to axially displace for engagement of the clutch;
   a seal plate sealed to the cover and disposed axially between the piston and the cover;
   a valve disposed between, and connected to, the seal plate and the piston, wherein the seal plate includes a first orifice and a portion of the valve is configured to seal the first orifice to restrict fluid flow to one direction;
   a first chamber formed at least in part by the cover, the seal plate, and the piston; and
   a second chamber formed at least in part by the piston and the impeller shell, wherein:
      in response to an increase of pressurized fluid in the first chamber relative to the second chamber, the piston is configured to axially displace to open the clutch;
      in response to an increase of pressurized fluid in the second chamber relative to the first chamber, the piston is configured to axially displace to close the clutch.

14. The torque converter of claim 13, wherein the first chamber is sealed from the second chamber.

15. The torque converter of claim 13, wherein:
   the seal plate includes a second orifice, the first and second orifices being radially offset.

16. The torque converter of claim 15, wherein, in response to the increase of pressurized fluid in the second chamber relative to the first chamber:
   fluid passes from the second chamber, through grooved surfaces of the clutch and then into the first chamber via the second orifice of the seal plate; and
   the portion of the valve closes such that fluid cannot pass through the first orifice.

17. The torque converter of claim 13, wherein, in response to the increase of pressurized fluid in the first chamber relative to the second chamber, the portion of the valve opens such that fluid flow passes through the first orifice from the first chamber.

18. The torque converter of claim 13, wherein the seal plate is sealed to the cover via a seal at a first end and connected to the cover and the piston at a second end, opposite the first end.

* * * * *